United States Patent
Liu

(10) Patent No.: US 8,742,637 B2
(45) Date of Patent: Jun. 3, 2014

(54) WATERPROOF AND SALT SPRAY-RESISTANT FAN MOTOR STRUCTURE

(75) Inventor: Wen-Hao Liu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 414 days.

(21) Appl. No.: 13/156,320

(22) Filed: Jun. 8, 2011

(65) Prior Publication Data

US 2012/0313469 A1 Dec. 13, 2012

(51) Int. Cl.
*H02K 5/10* (2006.01)
*F04D 29/04* (2006.01)

(52) U.S. Cl.
USPC ................... 310/88; 310/89; 417/423.12

(58) Field of Classification Search
USPC ............. 310/88–89, 216.004; 417/423.7, 417/423.14, 354
See application file for complete search history.

(56) References Cited

U.S. PATENT DOCUMENTS

| | | | | |
|---|---|---|---|---|
| 4,900,957 A * | 2/1990 | Barker et al. | | 310/62 |
| 5,689,147 A * | 11/1997 | Kaneda et al. | | 310/216.004 |
| 7,626,301 B2 * | 12/2009 | Enomoto et al. | | 310/216.004 |
| 2004/0189135 A1 * | 9/2004 | Chung | | 310/216 |
| 2006/0082241 A1 * | 4/2006 | Enomoto et al. | | 310/216 |
| 2006/0138894 A1 * | 6/2006 | Harada et al. | | 310/217 |
| 2007/0001527 A1 * | 1/2007 | Takahashi et al. | | 310/71 |
| 2007/0001528 A1 * | 1/2007 | Umegaki et al. | | 310/88 |
| 2007/0114856 A1 * | 5/2007 | Park | | 310/44 |
| 2007/0120436 A1 * | 5/2007 | Kawasaki et al. | | 310/217 |

FOREIGN PATENT DOCUMENTS

| | | | | |
|---|---|---|---|---|
| EP | 832801 A2 * | 4/1998 | | B60T 8/36 |
| EP | 2068003 A2 * | 6/2009 | | F04D 25/06 |

* cited by examiner

*Primary Examiner* — Tran Nguyen

(57) ABSTRACT

A waterproof and salt spray-resistant fan motor structure includes a base, a stator assembly, a case, and at least one circuit board. The base has a bearing cup vertically projected from one side thereof. The stator assembly is externally fitted around the bearing cup, and includes a plurality of silicon steel plates having windings mounted thereon. The case is arranged between the base and the stator assembly and internally defines a closed space, and the circuit board is located in the closed space. With these arrangements, the case protects the circuit board against corrosion by water and salt spray, enabling a fan to have largely extended service life.

6 Claims, 2 Drawing Sheets

WATERPROOF AND SALT SPRAY-RESISTANT FAN MOTOR STRUCTURE

FIELD OF THE INVENTION

The present invention relates to a fan motor structure, and more particularly to a waterproof and salt spray-resistant fan motor structure that protects a circuit board of a fan against corrosion by water and salt spray.

BACKGROUND OF THE INVENTION

The currently available cooling fan mainly includes a stator, a rotor, a circuit board, a blade assembly, and a frame.

The cooling fan has been widely used to remove heat generated by a variety of electronic devices and components, such as central processing units (CPU), servers, power supplies, communication chassis, and telecommunication base stations. The cooling fan is also often used in very severe environments, such as humid, wet, and salt spray environments. Since general cooling fans are not provided with any protective structure against water and salt spray, the stator and bearings inside the fan are subject to corrosion caused by invading water and salt spray. In some worse conditions, the circuit board of the fan is corroded and damaged to thereby shorten the service life of the fan.

Two solutions have been proposed to overcome the above problems. One of the two solutions is vacuum coating, and the other solution is injection molding. By way of vacuum coating, the stator and the circuit board of the fan are entirely coated with a layer of protective film to achieve the effect of water resistance. However, the vacuum coated protective film is a very thin layer of polymeric material, which is subject to breaking when the fan operates in a salt spray environment. This is because any salt crystals accumulated in the fan would abrade and break the polymeric protective film, resulting in invasion of salty water into the fan to cause short circuit and burnout of the electronic components thereof.

According to the injection molding solution, the stator and the circuit board are first assembled to the fan frame to form a subassembly, and then, put the subassembly in a mold and inject a molding material into the mold. After the molding material is hardened, the subassembly is enclosed in the molding material and removed from the mold. The molding material not only encloses the subassembly, but also fills up all internal spaces in between the stator and the circuit board, so as to provide the effect of water resistance. However, since the injection molded material is thick, it would have adverse influence on the heat dissipation of the enclosed electronic components to result in burned-out electronic components and failed fan.

While the above-mentioned vacuum coating and injection molding solutions are used to protect the electronic components, particularly the circuit board, of the cooling fan against corrosion, short circuit and burnout caused by water and salt spray, the effect that can achieved by these solutions is low. Further, the fan motor being enclosed in the injected molding material has obviously reduced heat dissipation performance to dangerously cause raised temperature of the motor.

In brief, the conventional waterproof and salt spray-resistant structures for cooling fan have the following disadvantages: (1) having limited protective effect; (2) causing accumulated heat inside the fan; and (3) reducing the heat dissipation efficiency of the fan.

SUMMARY OF THE INVENTION

A primary object of the present invention is to provide a waterproof and salt spray-resistant fan motor structure that protects a circuit board of a fan against corrosion by water and salt spray.

To achieve the above and other objects, the waterproof and salt spray-resistant fan motor structure according to a preferred embodiment of the present invention includes a base, a stator assembly, a case, and at least one circuit board. The base has a bearing cup vertically projected from one side thereof. The stator assembly is externally fitted around the bearing cup, and includes a plurality of silicon steel plates having windings mounted thereon. The case is arranged between the base and the stator assembly and internally defines a closed space, and the circuit board is located in the closed space. With these arrangements, the case protects the circuit board against corrosion by water and salt spray, enabling a fan to have largely extended service life.

In brief, the waterproof and salt spray-resistant fan motor structure according to the present invention provides the following advantages: (1) enabling the fan to have extended service life; (2) protecting the circuit board against corrosion by water and salt spray; and (3) allowing convenient replacement or maintenance of the circuit board.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
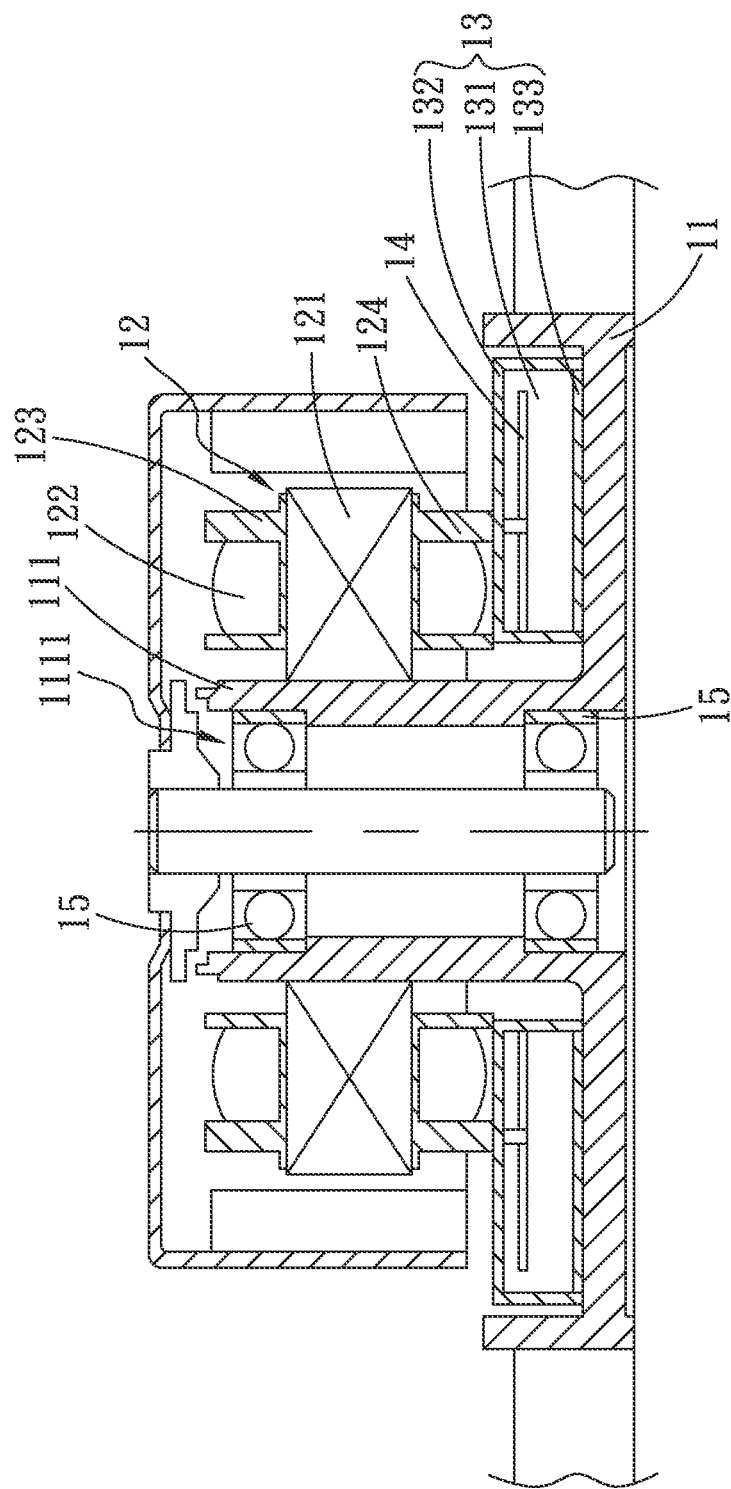
FIG. 1 is an assembled sectional view of a waterproof and salt spray-resistant fan motor structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is an assembled sectional view of a waterproof and salt spray-resistant fan motor structure according to a first embodiment of the present invention. For the purpose of conciseness, the present invention is also briefly referred to as "the fan motor structure" herein. As shown, the fan motor structure in the first embodiment includes a base 11, a stator assembly 12, a case 13, and at least one circuit board 14.

On the base 11, there is a bearing cup 111 vertically projected from one side of the base 11.

The stator assembly 12 is externally fitted around the bearing cup 111, and includes a plurality of silicon steel plates 121 having windings 122 mounted thereon. The stator assembly 12 further includes a first insulating plate 123 and a second insulating plate 124, which are separately located at two axially opposite sides of the stator assembly 12.

The case 13 is arranged between the base 11 and the stator assembly 12, and internally defines a closed space 131. The circuit board 14 is located in the closed space 131.

The case 13 includes a first part 132 and a second part 133, which are closed to each other to define the closed space 131 therebetween. In the illustrated first embodiment, the first part 132 is adjacent to the stator assembly 12 while the second part 133 is adjacent to the base 11.

The bearing cup 111 internally defines an axially extended space 1111 for receiving at least one bearing 15 therein.

Figure 2:
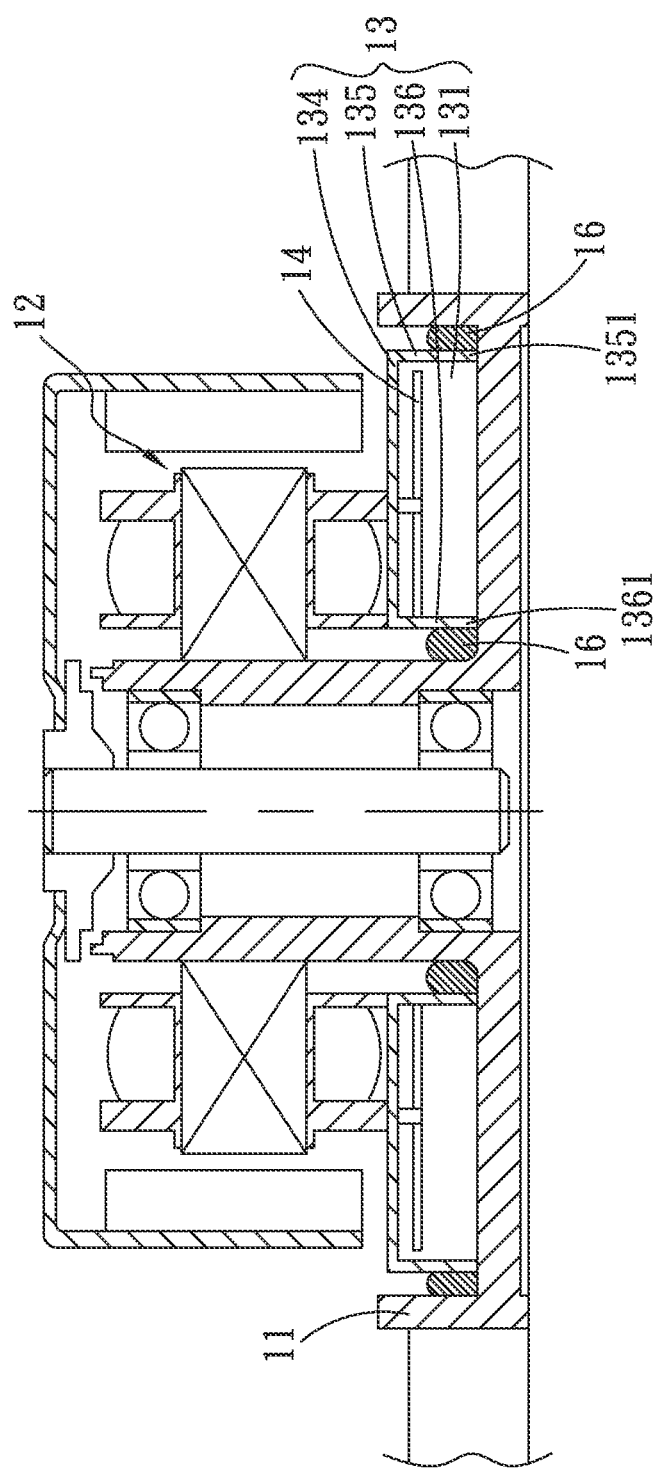
FIG. 2 is an assembled sectional view of a waterproof and salt spray-resistant fan motor structure according to a second embodiment of the present invention.

Please refer to FIG. 2 that is an assembled sectional view of a waterproof and salt spray-resistant fan motor structure according to a second embodiment of the present invention. As shown, in the second embodiment, the fan motor structure includes a base 11, a stator assembly 12, a case 13, and at least one circuit board 14.

The second embodiment is generally structurally similar to the first embodiment, except that the case 13 in the second embodiment includes a top portion 134, a first sidewall portion 135, and a second sidewall portion 136. The first and second sidewall portions 135, 136 are separately connected to and extended from two radially opposite sides of the top portion 134 to the base 11. The top portion 134 is located opposite to the base 11, and the first and the second sidewall portion 135, 136 are located opposite to each other. The top portion 135, the first and second sidewall portions 135, 136, and the base 11 together define the closed space 131 therebetween.

The first sidewall portion 135 has a first distal end 1351 in contact with the base 11, and the second sidewall portion 136 has a second distal end 1361 in contact with the base 11.

The first and the second sidewall portion 135, 136 respectively have a gasket 16 fitted around an outer surface thereof to seal joints between the distal ends 1351, 1361 and the base 11.

In both of the first and second embodiments, the windings 122 are electrically connected to the at least one circuit board 14.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A waterproof and salt spray-resistant fan motor structure, comprising:
    a base having a bearing cup vertically projected from one side thereof;
    a stator assembly being externally fitted around the bearing cup, and including a plurality of silicon steel plates having windings mounted thereon;
    a case being arranged between the base and the stator assembly, and internally defining a closed space;
    at least one circuit board being located in the closed space defined by the case;
    at least one gasket being externally fitted around the case;
    wherein the case includes a top portion, a first sidewall portion, and a second sidewall portion; the first and second sidewall portions being separately connected to and extended from two radially opposite sides of the top portion to the base, such that the top portion is located opposite to the base, the first and the second sidewall portions are located opposite to each other, and the top portion, the first and second sidewall portions and the base together define the closed space therebetween; and
    wherein the first sidewall portion has a first distal end and the second sidewall portion has a second distal end; and the first and second distal ends being in contact with the base.

2. The waterproof and salt spray-resistant fan motor structure as claimed in claim 1, wherein there are at least two gaskets separately fitted around outer surfaces of the first and second sidewall portions to seal joints between the base and the first and second distal ends of the first and second sidewall portions, respectively.

3. The waterproof and salt spray-resistant fan motor structure as claimed in claim 1, wherein the windings are electrically connected to the at least one circuit board.

4. The waterproof and salt spray-resistant fan motor structure as claimed in claim 1, wherein the bearing cup internally defines an axially extended space for receiving at least one bearing therein.

5. The waterproof and salt spray-resistant fan motor structure as claimed in claim 1, wherein the stator assembly further includes a first and a second insulating plate separately located at two axially opposite sides of the stator assembly.

6. A waterproof and salt spray-resistant fan motor structure, comprising:
    a base having a bearing cup vertically projected from one side thereof;
    a stator assembly being externally fitted around the bearing cup, and including a plurality of silicon steel plates having windings mounted thereon;
    a case being arranged between the base and the stator assembly, and internally defining a closed space;
    at least one circuit board being located in the closed space defined by the case;
    wherein the case includes a first part and a second part; and the first and the second part being closed to each other to define the closed space therebetween; and
    wherein the first part of the case is adjacent to the stator assembly and the second part of the case is adjacent to the base.

* * * * *